US006011317A

United States Patent [19]

Vilou

[11] Patent Number: 6,011,317

[45] Date of Patent: Jan. 4, 2000

[54] DEVICES FOR CONTROLLING AN AUTOMOBILE VEHICLE STARTER MOTOR CONTACTOR

[75] Inventor: Gérard Vilou, Tassin, France

[73] Assignee: Valeo Equipments Electriques Moteur, Cretail, France

[21] Appl. No.: 09/042,169

[22] Filed: Mar. 13, 1998

[30] Foreign Application Priority Data

Mar. 14, 1997 [FR] France ..................................... 97 03089

[51] Int. Cl.[7] .............................. F02N 11/00; H02P 9/04

[52] U.S. Cl. .................. 290/38 R; 290/37 R; 290/38 C; 290/38 D; 290/38 E; 290/28

[58] Field of Search .............................. 290/37 R, 38 R, 290/38 C, 38 E, 38 D; 123/179.3, 179 A, 179 B

[56] References Cited

U.S. PATENT DOCUMENTS

| | | | |
|---|---|---|---|
| 3,893,007 | 7/1975 | Mori | 317/9 B |
| 4,570,583 | 2/1986 | Hamano et al. | 123/179 |
| 4,862,010 | 8/1989 | Yamamoto | 290/38 R |
| 4,906,857 | 3/1990 | Cummins et al. | 290/38 R |
| 4,917,411 | 4/1990 | Cummins | 290/38 R |
| 4,947,051 | 8/1990 | Yamamoto et al. | 290/38 R |
| 5,197,326 | 3/1993 | Palm | 73/118.1 |
| 5,287,831 | 2/1994 | Andersen et al. | 123/179 |
| 5,564,375 | 10/1996 | Orzal | 123/179 |
| 5,691,576 | 11/1997 | Minks | 307/10.7 |

FOREIGN PATENT DOCUMENTS

| | | |
|---|---|---|
| 2 626 417 | 7/1989 | France . |
| 195 03 537 | 8/1996 | Germany . |

*Primary Examiner*—Elvin Enad
*Attorney, Agent, or Firm*—Morgan & Finnegan, L.L.P.

[57] ABSTRACT

A device for controlling an automobile vehicle starter motor contactor including a power contact controlling the supply of power to the electric motor of the starter motor and at least one coil controlling the movement of said contact, said device including a unit for controlling the starter motor and a transistor controlled by said unit that controls the energizing of the coil(s) of the contactor, wherein the control unit includes means for turning off the transistor if, between two successive times following closing of the starter switch, the voltage drop at a point connected to receive the battery voltage is smaller than a given threshold.

7 Claims, 1 Drawing Sheet

DEVICES FOR CONTROLLING AN AUTOMOBILE VEHICLE STARTER MOTOR CONTACTOR

The present invention relates to devices for controlling automobile vehicle starter motor contactors.

BACKGROUND OF THE INVENTION

FIG. 1 shows a starter motor D which includes an electric motor M connected between ground and a power supply terminal B+ at the battery voltage.

A contactor 1 connected between said terminal B+ and the electric motor M controls the supply of power to the motor.

The contactor 1 is a relay with a moving core (not shown) actuated by an actuator coil 2 and a latching coil 3 respectively for pushing a power contact la into a closed position and for holding it there.

The actuator coil 2 is connected between the coil 3 and the side of the motor M that is not connected to ground. The opposite end of said coil 3 is connected to ground.

At their common end, the coils 2 and 3 are connected to the source of a transistor 4, the drain of which is connected to the terminal B+ via the starter switch 6.

A microprocessor 5 also connected to the power supply terminal B+ applies a control voltage to the gate of the transistor 4 to control the transistor 4 on an on/off basis, for example. As shown in FIG. 1, for example, the microprocessor 5 is integrated with the relay 1 and the transistor 4 in the starter motor casing. It can equally well be external of the starter motor, anywhere on the vehicle.

When said transistor 4 turns on, both the actuator coil 2 and the latching coil 3 are energized simultaneously.

To obtain a high actuation force, the actuator coil 2 has a much lower resistance than the latching coil 3. Since the resistance of the electric motor M when stationary is negligible compared with the resistance of the coils 2 and 3, the current flowing through said transistor 4 is at a maximum as long as the contactor 1 is not closed. This causes intense and fast heating of the transistor 4.

The forces generated by the coils 2 and 3 of the contactor move the core which closes the power contact 1*a* at the end of its travel.

The point 7 between the coil 2, the motor M and the contact 1*a* is then at the B+ potential. The coil 2 then draws virtually no current since both its ends are very close to the supply voltage at the terminal B+.

The transistor 4 then energizes only the latching coil 3, which draws little current, so heating of said transistor 4 is considerably reduced.

However, the power contact la may be prevented from closing properly, for example because of particles of insulative material on the faces of the contact 1*a* or because of mechanical jamming of components of the relay. The coil 2 is then energized continuously via the transistor 4 because its end connected to the motor M (point 7) remains at a potential close to ground potential.

The transistor 4 is then very quickly destroyed by overheating.

OBJECTS AND SUMMARY OF THE INVENTION

An aim of the invention is to alleviate this drawback.

To this end the invention proposes a device for controlling an automobile vehicle starter motor contactor including a power contact controlling the supply of power to the electric motor of the starter motor and at least one coil controlling the movement of said contact, said device including a unit for controlling the starter motor and a transistor controlled by said unit that controls the energizing of the coil(s) of the contactor, wherein the control unit includes means for turning off the transistor if, between two successive times following closing of the starter switch, the voltage drop at a point connected to receive the battery voltage is smaller than a given threshold.

A device of the above kind advantageously has the following additional features alone or in any possible combination:

- the control unit is a microprocessor having an analogue-to-digital converter at its input connected to said point connected to receive the battery voltage and said microprocessor determines the voltage drop between said successive times following closing of the starter switch and compares said voltage drop to said threshold;
- the microprocessor controls the transistor on an on/off basis; and
- the microprocessor controls the transistor so as to energize the coil or coils of the contactor progressively.

The invention also provides a device for controlling the supply of power to an automobile vehicle starter motor that includes a contactor having a power contact that controls the supply of power to the electric motor of the starter motor and at least one coil that controls the movement of said contact, the device further including a contactor control device of the above type.

The invention further provides a starter motor integrating a control device of the above kind.

BRIEF DESCRIPTION OF THE DRAWING

Other features and advantages of the invention will emerge from the following description. The description is purely illustrative and not limiting on the invention. It must be read with reference to the appended drawing, in which.

MORE DETAILED DESCRIPTION

Figure 1:
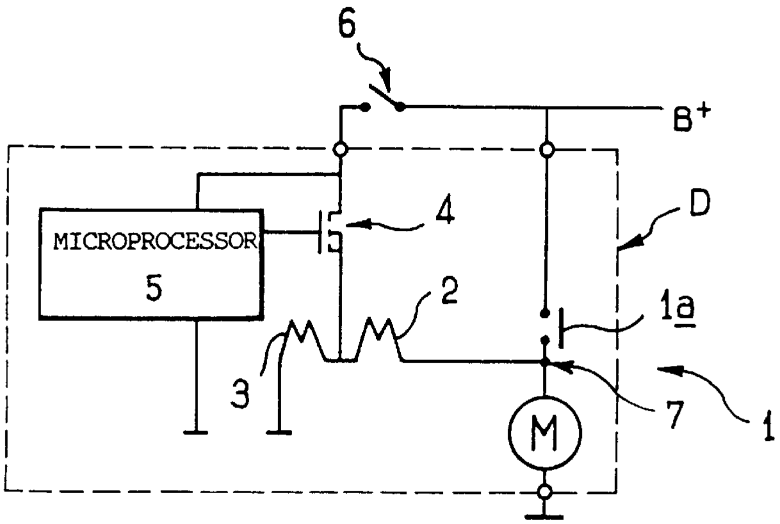
FIG. 1, described above, is a diagram showing a starter motor including an electronic control device.

The control device has a general structure analogous to that shown in FIG. 1.

At its input, which is connected to the terminal B+ via the starter switch 6, the microprocessor 5 includes an analogue-to-digital converter 8 enabling it to measure the supply voltage at the terminal B+ when the switch 6 closes.

Figure 3:
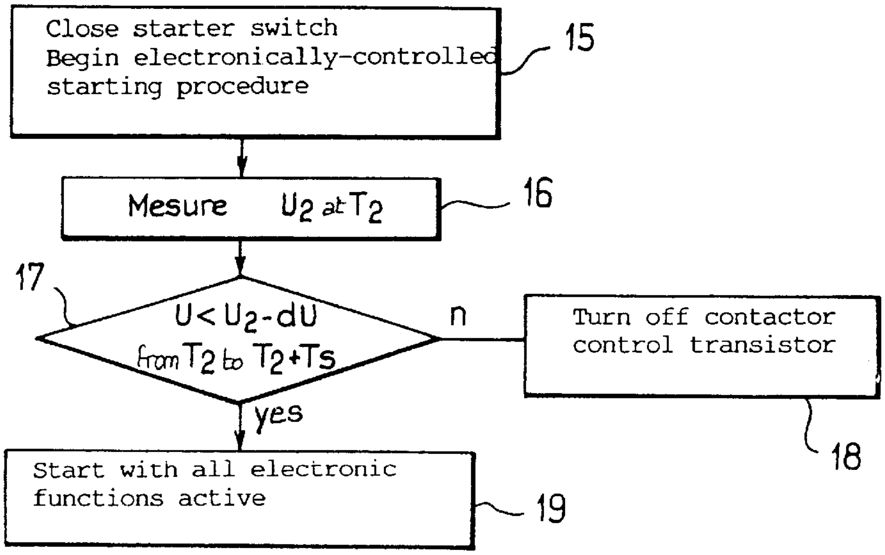
FIG. 3 is a flowchart showing various steps implemented by the microprocessor of the FIG. 2 device.

When the starter switch 6 closes, the microprocessor 5 begins the starting process by turning on the transistor 4 (step 15 in the FIG. 3 flowchart) and measuring the voltage $U_2$ at a time $T_2$ following closing of the switch 6 (step 16).

The time $T_2$ is approximately 10 milliseconds to 20 milliseconds after the transistor 4 turns on.

Figure 2:
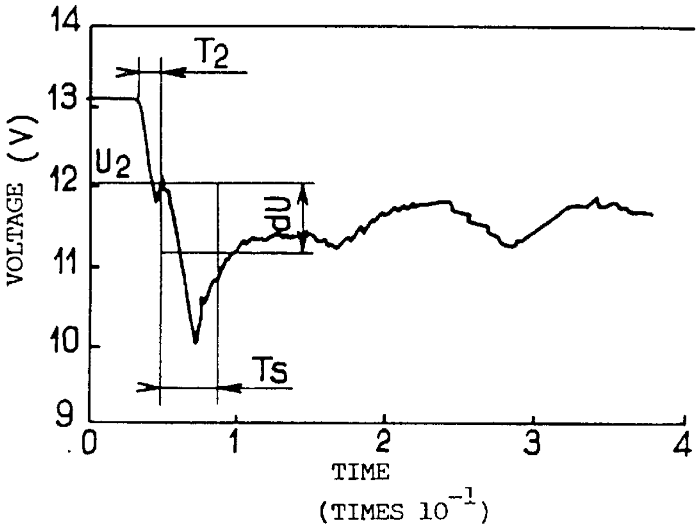
FIG. 2, which illustrates the principle employed by the invention, is a graph showing how the voltage at the power supply terminal changes to the battery voltage during closing of the power contact of the contactor from FIG. 1.

FIG. 2 shows how the voltage at the power supply terminal B+ varies during a normal start.

When the switch 6 closes the voltage is subject to a first drop that corresponds to the current drawn by the contactor.

Because of inductive effects and because of the variation in the reluctance of the contactor due to the movement of the core, the voltage does not remain constant. Slight undulations occur during this phase of operation.

When the power contact la closes, the current surge as the electric motor starts produces a further voltage drop which in practice is always greater than 1 volt. Consequently, at the end of step 16 the microprocessor 5 verifies the occurrence of a significant voltage drop at the end of a time period $T_s$, generally between a few tenths of a second and a few seconds.

For example, the microprocessor 5 verifies whether or not the voltage at time $T_2+T_s$ is greater than $U_2-dU$, where dU is the smallest expected voltage drop (step 17).

If the new voltage is not lower than $U_2-dU$, that is to say if the voltage drop has not occurred, the microprocessor 5 turns off the transistor 4 to prevent it being damaged (step 18).

Otherwise the microprocessor 5 continues the starting process (step 19).

The time period $T_s$ is obviously selected so that the transistor 4 is not damaged by overheating.

This solution has the advantage of preventing the power transistor 4 being damaged by extended operation in actuation mode and does not necessitate any additional component to implement this function.

The solution described above could of course be applied in the same manner if the transistor switched the current on a progressive basis rather than on an on/off basis, in which case the relay could include only one coil in place of an actuator coil and a latching coil.

Note also that the starter motor electronic control device shown in FIG. 1 has the advantage of being "self-contained", that is to say of not necessitating any electrical connection other than those used by conventional non-electronic starter motors, namely a control cable for connecting it to the starter switch of the vehicle, a power supply cable connected to a power supply terminal such as the positive terminal of the battery, and a ground return via the starter motor casing.

I claim:

1. A device for controlling a contactor of a starter motor of an automobile vehicle, said contactor including a power contact controlling the supply of power to an electric motor of the starter motor and at least one coil controlling the movement of said contact, said device including a unit for controlling the starter motor and a transistor controlled by said unit that controls the energizing of the at least one coil of the contactor, wherein the control unit includes means for turning off the transistor if, after comparing a voltage drop at a point connected to receive the battery voltage between two successive time periods following closing of the starter switch, the compared voltage drop is smaller than a given threshold.

2. A device according to claim 1, wherein the control unit is a microprocessor having an analogue-to-digital converter at its input connected to said point connected to receive the battery voltage and wherein said microprocessor determines the voltage drop between said successive times following closing of the starter switch and compares said voltage drop to said threshold.

3. A device according to claim 1, wherein the microprocessor controls the transistor on an on/off basis.

4. A device according to claim 1, wherein the microprocessor controls the transistor so as to energize the coil or coils of the contactor progressively.

5. A device for controlling the supply of power to an automobile vehicle starter motor that includes a contactor having a power contact that controls the supply of power to the electric motor of the starter motor and at least one coil that controls the movement of said contact, the device further including a control device for the contactor according to claim 1.

6. A device according to claim 5, wherein the contactor includes an actuator coil and a latching coil.

7. An automobile vehicle starter motor integrating a power supply control device according to claim 6.

* * * * *